(12) United States Patent
Koger et al.

(10) Patent No.: US 9,188,889 B2
(45) Date of Patent: Nov. 17, 2015

(54) HIGH OPACITY LASER PRINTABLE FACESTOCK

(75) Inventors: Linwood G. Koger, South Euclid, OH (US); William J. Buehne, Highland, IN (US); Le-Hoa Hong, Monterey Park, CA (US); Iliana Velazquez, Huntington Beach, CA (US); Tamara L. McCartney, Stow, OH (US); Wendy Shuttleworth, Painesville, OH (US); Anahit Tataryan, Temple City, CA (US); Vikaas Gupta, St. John, IN (US)

(73) Assignee: CCL LABEL, INC., Framingham, MA (US)

( * ) Notice: Subject to any disclaimer, the term of this patent is extended or adjusted under 35 U.S.C. 154(b) by 624 days.

(21) Appl. No.: 12/846,998

(22) Filed: Jul. 30, 2010

(65) Prior Publication Data

US 2011/0123753 A1    May 26, 2011

Related U.S. Application Data

(63) Continuation-in-part of application No. 12/205,774, filed on Sep. 5, 2008.

(60) Provisional application No. 60/970,917, filed on Sep. 7, 2007, provisional application No. 61/051,185, filed on May 7, 2008.

(51) Int. Cl.
*B32B 33/00* (2006.01)
*B32B 27/36* (2006.01)
(Continued)

(52) U.S. Cl.
CPC .............. *G03G 7/0013* (2013.01); *B32B 7/12* (2013.01); *B32B 27/08* (2013.01); *B32B 27/20* (2013.01);
(Continued)

(58) Field of Classification Search
CPC ........ B32B 27/08; B32B 27/20; B32B 27/36; B32B 7/12; B32B 2255/10; B32B 2264/102; B32B 2307/406; B32B 2307/41; B32B 2519/00; G09G 7/0013; G09G 7/0053; G09G 7/008; G09G 7/0086; Y10T 428/14
USPC ....................................... 428/40.1
See application file for complete search history.

(56) References Cited

U.S. PATENT DOCUMENTS 3,904,876 A    9/1975  Arendt
4,713,273 A   12/1987  Freedman
(Continued)

FOREIGN PATENT DOCUMENTS

JP    49-093462      9/1974
JP    2000141576     5/2000
(Continued)

OTHER PUBLICATIONS

Machine translation of JP 2005-154942 A, Jun. 15, 2005.*
(Continued)

*Primary Examiner* — Patricia L Nordmeyer
(74) *Attorney, Agent, or Firm* — McDonald Hopkins LLC

(57) ABSTRACT

A multilayer laminate such as a label assembly having high opacity and desirable appearance characteristics is described. The laminate includes a facestock layer, an adhesive layer, and a liner layer. The facestock layer includes a print-receiving top coat layer that includes a combination of titanium dioxide and one or more optical brighteners. The combination of these materials avoids build up of static charges upon laser printing on the facestock.

36 Claims, 7 Drawing Sheets

(51) Int. Cl.
*G03G 7/00* (2006.01)
*B32B 7/12* (2006.01)
*B32B 27/08* (2006.01)
*B32B 27/20* (2006.01)
*B32B 29/00* (2006.01)
*G09F 3/02* (2006.01)
*G09F 3/10* (2006.01)

(52) U.S. Cl.
CPC ............... *B32B 27/36* (2013.01); *B32B 29/00* (2013.01); *G03G 7/008* (2013.01); *G03G 7/0053* (2013.01); *G03G 7/0086* (2013.01); *G09F 3/02* (2013.01); *G09F 3/10* (2013.01); *B32B 2255/10* (2013.01); *B32B 2264/102* (2013.01); *B32B 2307/406* (2013.01); *B32B 2307/41* (2013.01); *B32B 2519/00* (2013.01); *Y10T 428/14* (2015.01)

(56) References Cited

U.S. PATENT DOCUMENTS

| | | | |
|---|---|---|---|
| 4,763,930 | A | 8/1988 | Matney |
| 4,863,772 | A | 9/1989 | Cross |
| 5,131,910 | A | 7/1992 | Breault |
| 5,192,611 | A | 3/1993 | Tomiyama et al. |
| 5,314,560 | A | 5/1994 | Pritchet |
| 5,354,588 | A | 10/1994 | Mitchell et al. |
| 5,417,790 | A | 5/1995 | Petrou |
| 5,418,026 | A | 5/1995 | Dronzek |
| 5,547,738 | A | 8/1996 | Mitchell et al. |
| 5,735,549 | A | 4/1998 | Konkol et al. |
| 5,785,748 | A | 7/1998 | Banford |
| 5,800,893 | A | 9/1998 | Harden |
| 5,830,571 | A | 11/1998 | Mann et al. |
| 5,833,747 | A | 11/1998 | Bleakley et al. |
| 5,914,165 | A | 6/1999 | Freedman |
| 5,919,537 | A | 7/1999 | Niazy |
| 5,972,155 | A | 10/1999 | Cooprider et al. |
| 5,981,009 | A | 11/1999 | Iacono et al. |
| 6,086,107 | A * | 7/2000 | Whistler et al. ............ 283/81 |
| 6,143,408 | A | 11/2000 | Fujita |
| 6,254,138 | B1 | 7/2001 | Rawlings et al. |
| 6,268,032 | B1 * | 7/2001 | Mertens et al. ............ 428/40.1 |
| 6,358,588 | B1 | 3/2002 | Edwards et al. |
| 6,461,706 | B1 | 10/2002 | Freedman et al. |
| 6,503,620 | B1 | 1/2003 | Xie et al. |
| 6,521,312 | B1 | 2/2003 | Keiser |
| 6,576,325 | B1 | 6/2003 | Yamanaka et al. |
| 6,663,947 | B2 | 12/2003 | Freedman et al. |
| 6,770,344 | B2 | 8/2004 | Moriwaki et al. |
| 6,780,484 | B2 | 8/2004 | Kobe et al. |
| 6,848,205 | B2 | 2/2005 | Rieger et al. |
| 6,916,518 | B2 | 7/2005 | Chen |
| 6,951,683 | B2 | 10/2005 | Blackwell |
| 6,984,429 | B2 | 1/2006 | Thunhorst et al. |
| 7,135,258 | B2 * | 11/2006 | Aylward et al. ............ 430/15 |
| 7,138,172 | B2 | 11/2006 | Marks |
| 2002/0090482 | A1 | 7/2002 | Motomiya |
| 2003/0188393 | A1 | 10/2003 | Tindal |
| 2004/0038056 | A1 | 2/2004 | Song et al. |
| 2004/0202833 | A1 | 10/2004 | Anderson |
| 2006/0155005 | A1 | 7/2006 | Kondo et al. |
| 2007/0054141 | A1 * | 3/2007 | Francis et al. ............ 428/480 |
| 2007/0059453 | A1 | 3/2007 | Benson |
| 2007/0062653 | A1 | 3/2007 | Duggirala et al. |
| 2007/0077410 | A1 | 4/2007 | Shi |
| 2007/0103528 | A1 | 5/2007 | Pearl et al. |
| 2007/0120283 | A1 | 5/2007 | Hostetter et al. |
| 2007/0141291 | A1 | 6/2007 | Buck |
| 2007/0170716 | A1 | 7/2007 | Cerkleski |
| 2007/0231571 | A1 | 10/2007 | Lane et al. |
| 2007/0248810 | A1 | 10/2007 | McGee et al. |
| 2007/0292709 | A1 | 12/2007 | Oishi et al. |
| 2007/0298228 | A1 | 12/2007 | Ohkawachi et al. |
| 2008/0199647 | A1 | 8/2008 | Blackwell et al. |
| 2008/0206461 | A1 | 8/2008 | Patel |
| 2009/0068389 | A1 | 3/2009 | Maule et al. |
| 2009/0197032 | A1 | 8/2009 | Didulo et al. |

FOREIGN PATENT DOCUMENTS

| | | |
|---|---|---|
| JP | 2005154942 A * | 6/2005 |
| JP | 2006028706 | 10/2006 |
| WO | 98-04405 | 2/1998 |
| WO | 2007-029194 | 3/2007 |
| WO | 2007048878 | 5/2007 |

OTHER PUBLICATIONS

Patent Examination Report No. 1 (Australia), dated Jun. 2, 2014.
First Examination Report (New Zealand), dated Aug. 23, 2013.
First Office Action (China), dated Sep. 28, 2014.
International Preliminary Report on Patentability (WO), dated Feb. 5, 2013.
Reflectance Measurements: Specular Included versus Specular Excluded, Hunter Lab, http://www.hunterlab.com/appnotes/an04_01r2.pdf, 2009.
Demystifying Three Key Paper Properties, Xerox Corporation http://www.xerox.com/downloads/usa/en/t/ThreeKeyPaperPropertiesWhitePaper.pdf, 2005.
Does Brightness Equal Brightness?, United Stationers Supply Company, http://paperrap.com/papernews/archive/dec01/asp, Dec. 2001.
Reviewing the Concept of Paper Brightness, Axiphos GmbH, http://axiphos.com/BrightnessReview.pdf, Aug. 2001.
Amendment dated Nov. 18, 2010 from related Australian Application No. 2008296069.
Office Action dated Apr. 15, 2010 from related Chilean Application No. 2636-2008.
Response dated Jul. 13, 2010 from related Chilean Application No. 2636-2008.
Office Action dated Oct. 15, 2019 from related Chilean Application No. 2636-2008.
Response dated Apr. 11, 2011 in 4448-CL from related Chilean Application No. 2636-2008.
Office Action dated Jun. 29, 2011 from related New Zealand Application No. 583406.
IPRP dated Oct. 28, 2009 from related International Application No. PCT/US2008/75490.0.
International Search Report and Written Opinion dated May 6, 2009 from corresponding International Application No. PCT/US2008/075490.
Amendment under Article 34 dated Aug. 5, 2009 from corresponding International Application No. PCT/US2008/075490.
English Translation fo JP 49-093462 A, Sep. 1974.
Puebla C, Whiteness Assessment: A Primer, 09/206, Axiphos GmbH, Copyright 2001-2006.
English Abstract for JP 49-093462 A, Sep. 1974.
Machine Translation of JP 2006028706 A, Feb. 2006.
Handbook of Physical Testing of Paper, vol. 2, 2nd Edition, 2002 (no month).
Digital Printing Glossary—Gloss, Dec. 2007.
Understanding Brightness and Whiteness, Mar. 2003 (Wayback Machine).
English Abstract of JP 2000-141576 A, May 2000.
Patent Examination Report No. 2 for corresponding Australian Patent Application No. 2008296069 dated Sep. 2, 2013.
Communication pursuant to Article 94(3) EPC for corresponding European Patent Application No. 08 799 270.7 dated Nov. 14, 2014.
Russian Office Action for Russian Application No. 2013107660/05, mailed Aug. 31, 2015.

* cited by examiner

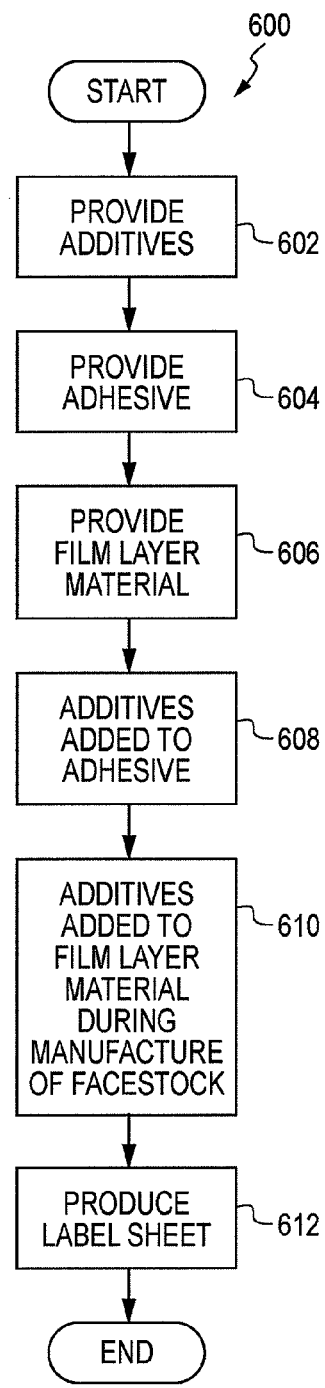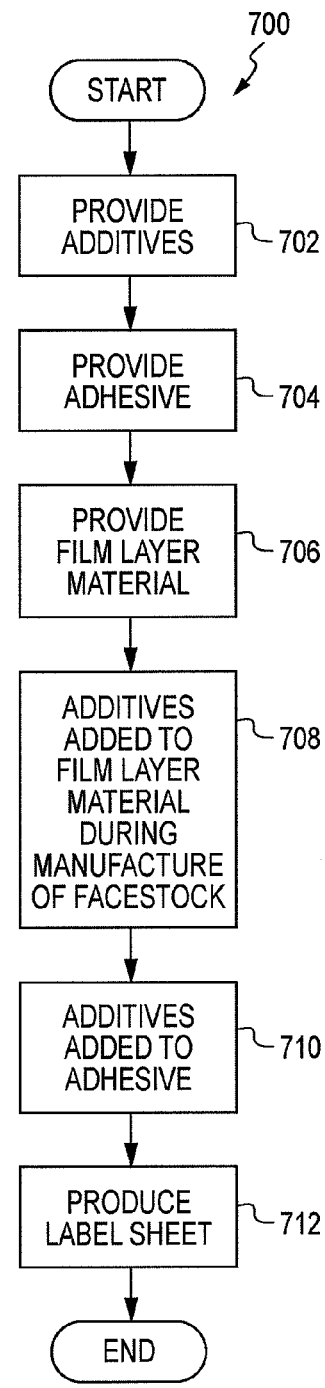
FIG. 6
FIG. 7

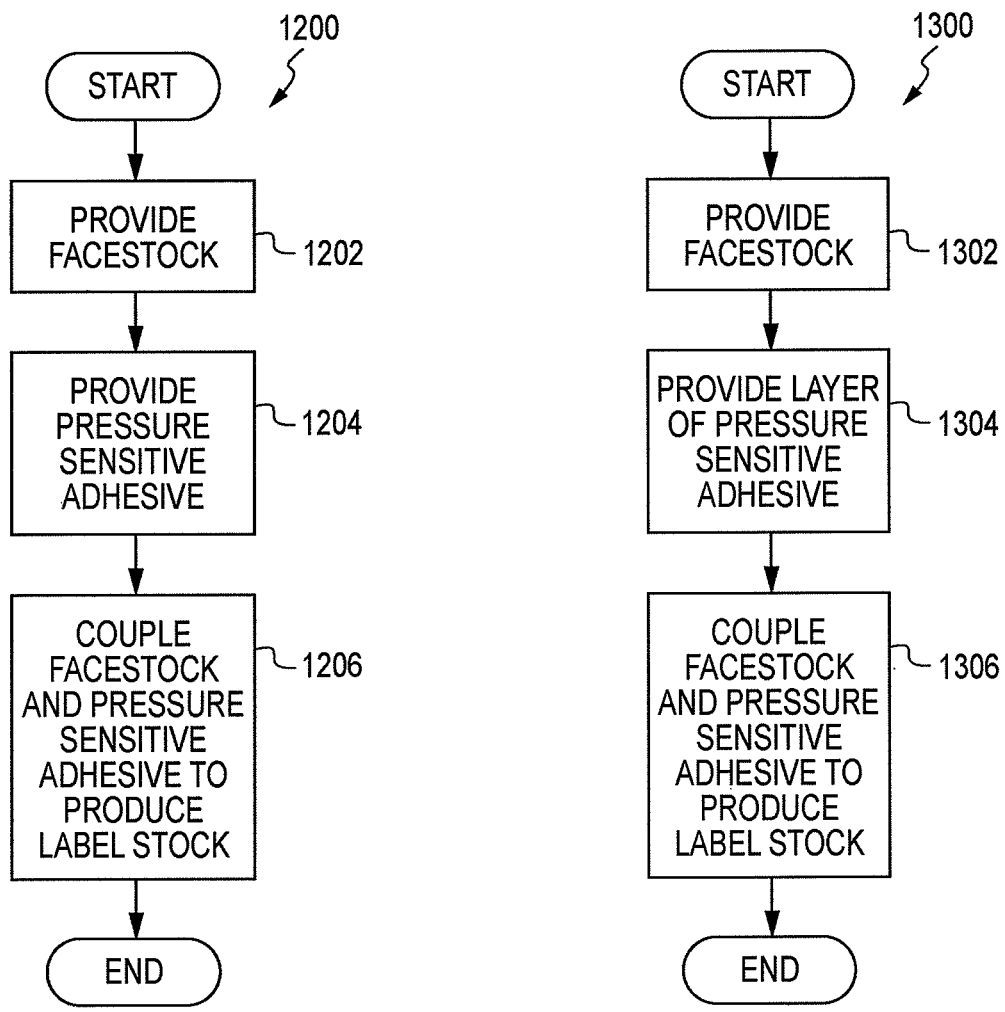

HIGH OPACITY LASER PRINTABLE FACESTOCK

CROSS-REFERENCE TO RELATED APPLICATIONS

This application is a Continuation-In-Part (CIP) application of U.S. patent application Ser. No. 12/205,774 filed on Sep. 5, 2008, which claims priority upon U.S. Provisional Patent Application No. 60/970,917 filed Sep. 7, 2007, and U.S. Provisional Patent Application No. 61/051,185 filed May 7, 2008, all of which are incorporated herein by reference in their entireties.

FIELD OF THE INVENTION

The present invention relates to labels. More specifically, the invention relates to labels that prevent viewing of covered indicia through the label when applied to a substrate or another label.

BACKGROUND OF THE INVENTION

Labels for shipping containers are required to be resistant to exposure to weather conditions such as rain and snow. In order to meet this moisture resistant requirement, filmic labels are preferred over paper labels. Additionally, consumers prefer to reuse shipping containers by applying a new label over the existing address on the container. It is highly desired that the previous address information not be visible through the new label.

A preferred method of printing address information on a label is with a laser printer or similar device such as a photocopier. However, the high temperatures and static charge utilized in a laser printing process presents additional challenges that require the label to be resistant to high temperatures and have a low propensity to store electrical charge. Although efforts have been made to produce high opacity filmic labels, a continuing need exists for a high opacity filmic label which is heat resistant and has a low propensity to store electrical charge.

SUMMARY OF THE INVENTION

The difficulties and drawbacks associated with previously known labels and related products are addressed in the present facestock product, label sheet, and related methods.

In one aspect, the present invention provides a high opacity laser printable film facestock comprising a laser printable film facestock having a printable first layer, a second layer, and a third layer. The laser printable film facestock exhibits an opacity greater than or equal to approximately 99.0%, a CIELAB L* greater than or equal to approximately 93.5, a CIELAB b* less than or equal to approximately −5.0, and at least one of (i) a whiteness index greater than or equal to approximately 110, and (ii) a brightness greater than or equal to approximately 94.5%. The laser printable film facestock has a thickness less than or equal to approximately 2.5 mils.

In another aspect, the invention provides a label sheet comprising a liner sheet and a facestock sheet including a laser printable film facestock having a printable first layer, a second layer, and a third layer. The laser printable film facestock exhibits a CIELAB L* greater than or equal to approximately 93.5, a CIELAB b* less than or equal to approximately −5.0, an opacity greater than or equal to approximately 99.0%, and at least one of (i) a whiteness index greater than or equal to approximately 110, and (ii) a brightness greater than or equal to approximately 94.5%. The laser printable film facestock has a thickness less than or equal to approximately 2.5 mils. The label sheet also includes cut lines through the facestock sheet but not through the liner sheet, thereby defining at least one label. And, the label sheet also comprises a layer of pressure sensitive adhesive releasably coupling the liner sheet to the facestock sheet.

As will be realized, the invention is capable of other and different embodiments and its several details are capable of modifications in various respects, all without departing from the invention. Accordingly, the drawings and description are to be regarded as illustrative and not restrictive.

BRIEF DESCRIPTION OF THE DRAWINGS

These and other features, aspects and advantages of the present invention will be better understood with reference to the following description, appended claims and accompanying drawings, where:

FIG. 6 is a flowchart illustrating a preferred embodiment method for producing a label sheet according to the invention.

FIG. 7 is a flowchart of another preferred embodiment method for producing a label sheet according to the invention.

FIG. 12 is a flowchart of a preferred embodiment method for producing a label stock according to the invention.

FIG. 13 is a flowchart of another preferred method for producing a label stock according to the invention.

Figure 1:
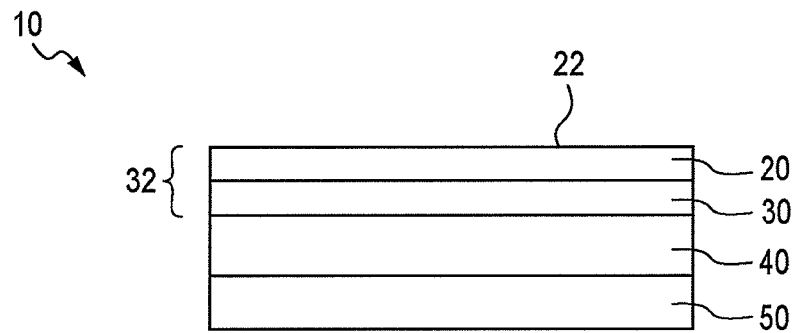
FIG. 1 is a schematic cross sectional view of a preferred embodiment multilayer laminate according to the present invention.

Unless otherwise indicated, the illustrations in the above figures are not necessarily drawn to scale.

DETAILED DESCRIPTION OF THE EMBODIMENTS

The present invention relates to high opacity printable films or laminates. The films or laminates can be used for shipping labels that can be placed over existing labels or other markings, to hide or block the underlying label or markings from showing through.

A particular feature of the present invention is that the films or laminates can be used in laser printers. Typically, the high pigment loadings required to produce a high opacity film, preclude the use of such films in laser printers. That is, if such films are used in laser printers, they tend to cause static shocks to users due to the high concentrations of metalized pigments or materials that provide the high opacity.

The present invention is based upon a discovery that high opacity films or laminates can be formed by using a combination of titanium dioxide pigment in conjunction with one or more optical brighteners. The combination of these materials in a film or laminate does not result in electrical shocks when the film or laminate is used in a laser printer. In addition, this combination provides remarkably high levels of opacity, brightness and whiteness qualities.

In one embodiment, a high opacity multilayer laminate is provided in which a film layer and a liner layer are separated by a layer of a pressure sensitive adhesive.

More specifically, the invention provides a high opacity multilayer laminate in the form of (i) a facestock, (ii) a layer of a pressure sensitive adhesive and (iii) a liner. The layer of pressure sensitive adhesive is disposed between the facestock and the liner. The facestock is preferably die cut to form labels carried and retained on the liner by the pressure sensitive adhesive.

The facestock of the invention preferably exhibits various optical characteristics and a thickness of less than 2.5 mils. Various details and additional aspects of the high opacity facestock and associated laminates and layered assemblies are set forth herein as follows.

As used herein, opacity is defined as the measurement of the ability of an object to prevent the passage of light through it. The higher the measure of opacity, the more opaque the object is and the more difficult it is to discern underlying indicia. Objects can have increased opacity measurements through the addition of materials designed to increase opacity, for example, by using additional layers of materials or by increasing the amount of material that light must travel through. It is possible for an object to be opaque to one type of light and not to other types, for example, an object may be opaque to ultra-violet light but transparent to visible light. In the present context, the opacity of the preferred embodiment labels of the present invention refers to the labels being opaque to visible light.

Brightness, as used herein, is defined as a measurement of the amount of light reflected from the surface of an object. Brightness of a surface is determined by following the Technical Association of the Pulp and Paper Industry ("TAPPI") T-452 om-92 test method, and is based upon reflection of blue light of 457 nm wavelength.

Whiteness index, as used herein, is based upon the ASTM E313 specification. Whiteness is the degree to which a surface matches a white reference standard. In lay terms, whiteness is a measurement of light reflectance across all wavelengths of light comprising the full visible spectrum. In technical terms, whiteness is a single number index referencing the relative degree of whiteness (of near-white materials under specific lighting conditions). Generally, the higher the whiteness value, the whiter the material.

There are many alternate ways to describe color. Color, as used herein, is the color space defined as CIE L*a*b* (CIELAB), developed by the International Commission on Illumination (Commission Internationale d'Eclairage or CIE). In this 3-dimensional color space system, L* (CIELAB L*) represents the lightness of the color and ranges from 0 (black) to 100 (white), a* represents the color's position along the red(magenta)/green axis (negative values represent green and positive values represent red or magenta), and b* (CIELAB b*) represents the color's position along the blue/yellow axis (negative values represent blue and positive values represent yellow).

Preferably, the high opacity laminates and labels comprise (i) one or more facestock layers which generally include one or more printable top coats and one or more film layers, (ii) one or more layers of pressure sensitive adhesives, and (iii) one or more liners. Each of these components is further described as follows.

Facestock

The facestock includes at least an outer printable layer generally referred to herein as a top coat, and a structural film layer. The facestock may also include one or more additional layers. Preferably, the facestock includes a film layer having a top coat on one face of the film layer and a hide coat disposed on an opposite face of the film layer. The printable layer or top coat includes a combination of titanium dioxide and an optical brightener. The hide coat includes a combination of titanium dioxide and one or more polyester agents. The titanium dioxide and optical brightener are preferably applied onto the film layer by application of a top coat. The film layer can be any film having a softening point of at least about 200° C. A preferred example of the film layer is a polyester such as PET. Preferred aspects of the facestock components are as follows.

Film Layer

The film layer is a thermal resistant film which does not soften when passed through a typical fuser mechanism as used in a laser printer. Examples of such films include, but are not limited to, polyethylene terephthalate, polyimide, polyetherimide, polysulfone, polyethersulfone, polytetraflouroethylene, nylon 6, nylon 6/6, nylon 6,10, nylon 11, nylon 12, polyamide-imide, polybutylene terephthalate, polyeheretherketone, including blends or copolymers thereof. The coextruded polyolefin, heat resistant polymer films such as those described in U.S. Pat. No. 5,830,571 may also be used. As noted, the selected film material preferably exhibits a softening point of at least about 200° C. The film layer may contain opacifying pigments such as titanium dioxide, calcium carbonate, kaolin clay, barium sulfate, carbon black, hollow spheres, etc. The film layer may be cavitated to increase opacity and brightness. However, it is generally preferred that the film layer not be cavitated. Optical brighteners such as those included in the laser top coat layer described below, may be included in the film layer.

A typical range and preferred thickness for the film layer is from about 0.5 mils (12.7 μm) to about 2.2 mils (55.88 μm), with 2 mils (50.8 μm) being preferred.

Printable/High Opacity Layer (Top Coat)

The outer printable layer of the facestock includes a combination of titanium dioxide and optical brighteners. This combination is preferably applied as a top coat to the film layer. Regarding the titanium dioxide, Rutile coatings grade is preferred, Anatase may also be used. The titanium dioxide particles have a maximum span of approximately 200 nm to 600 nm, and preferably about 410 nm. The term "maximum span" refers to the average value of the maximum distance extending across a particle from a representative sample of particles in the top coat formulation. For example, for spherical particles, the maximum distance extending across a particle corresponds to the diameter of the particle. The weight percent concentration of the titanium dioxide is preferably from about 2.5% to about 12.5%, based upon the total weight of the top coat formulation. All percentages noted herein are percentages by weight unless indicated otherwise.

The outer printable layer of the facestock, i.e. the top coat, also includes optical brighteners. The optical brightener is an organic compound that absorbs ultraviolet light and reemits light in the visible range. Examples include but are not limited to triazine-stilbenes, coumarins, imidazolines, diazoles, thiaxoles, benzoxalines, biphenyl-stilbenes and combinations thereof. Examples of commercially available optical brighteners include UVITEX OB, UVITEX MES, LEUCOPUR EGM and EASTOBRITE OB-1. UVITEX OB and UVITEX MES are available from Ciba Specialty Chemicals, High Point, N.C. or Ciba of Basel, Switzerland. LEUCOPUR EGM is an optical brightener and is available from Ciba. EASTOBRITE OB-1 is another optical brightener available from Eastman Chemical of Kingsport, Tenn. The one or more optical brighteners are utilized in amounts such that when incorporated into a top coat formulation and formed into a top coat layer as described herein, the resulting top coat layers exhibit the noted optical properties described herein. These amounts are referred to herein as "effective amounts" of the one or more optical brighteners. Preferred weight percent concentrations used for the optical brighteners are from about 0.05% to about 0.75%, based upon the total weight of the top coat formulation.

Typically, titanium dioxide interferes with optical brighteners. And so, in the preferred embodiments described herein, the concentration of $TiO_2$ in the print receptive coating is optimized to aid in opacity with minimal interference with the optical brighteners in the coating and the optical brighteners which may also be present in the white film. Higher levels of $TiO_2$ in the top coat typically result in reduced brightness of the film composite.

Although the various top coat formulations described herein use titanium oxide, it is contemplated that one or more other nonmetallic pigments such as metallic oxides may be used instead of or in combination with the titanium dioxide. Therefore, it will be appreciated that in no way is the invention limited to the sole use of titanium oxide in conjunction with one or more optical brighteners as described herein. The term "nonmetallic pigments" refers to an agent free of any metals existing in their elemental form, and which agent is typically used to impart color to a composition. Imparting color to a composition requires that the incorporation of the agent into the composition changes the color of reflected or transmitted light as the result of wavelength-selective absorption. Thus, nonmetallic pigments typically exclude metallic pigments such as aluminum particles or aluminum flakes. And, nonmetallic pigments typically include titanium dioxide and potentially other metallic oxides, and may for example be in the form of barium sulfate, silica dioxide, calcium carbonates, kaolin clays, and carbon blacks. The term "metallic pigments" refers to one or more metals in their elemental form and which are used to impart color to a composition. Representative examples of such include but are not limited to aluminum, copper, and iron, in any shape such as particles or flakes.

The preferred top coat formulations also comprise one or more binders. A wide array of binders can be used. For example, an inert polyester binder available under the designation VITEL PE 200 from Bostik, Mass. can be used. It will be appreciated that the various top coat formulations preferably employ one or more binders, the selection of which is dictated primarily by process and application considerations.

Numerous top coat layers can be used, such as, for example, a top coat, a top coat base layer, and a top coat base intermediate layer. Representative examples of these are described in various examples presented herein. For example, in certain embodiments, it is preferred to include a top coat generally comprising titanium dioxide, one or more optical brighteners, a polyester intermediate formulation, and one or more other agents. Representative top coat formulations, according to various embodiments of the invention, are set forth in the various tables herein.

A wide range of thicknesses and coat weights can be used for this layer or collection of layers. A representative preferred range of coating weights for a top coat is from about 1 to about 10 grams per square meter ($g/m^2$ or gsm), more preferably from about 2 to about 8 $g/m^2$, and most preferably from about 4 to about 6 $g/m^2$. It will be understood that the present invention includes the use of top coats having coating weights less than or greater than these amounts.

Hide Coat

Preferred embodiment facestocks as described herein include one or more hide coats. Preferably, the one or more hide coats are disposed alongside a face of the film layer that is opposite the face along which the one or more top coats reside. Generally, the one or more hide coats comprise titanium dioxide, as previously noted for use in the top coat, in conjunction with one or more polyester agents, and optionally further in combination with one or more solvents. The concentration of titanium dioxide in the hide coat can be any effective concentration that results in the desired effect. The desired effect, as explained throughout the present application is to increase opacity of the facestock or label, avoid detrimental effects with optical brighteners, and provide a label that is heat resistant and has a low propensity to store electrical charge. The polyester agent is preferably an inert polyester binder which for example is available from numerous commercial sources. Also, it may be preferred to include one or more hide coats in association with the film layer. Preferred hide coats generally comprise titanium dioxide, a polyester intermediate formulation, and one or more other agents. The hide coat may also contain inert filler such as silica or calcium carbonate. Preferred examples of particular top coats and hide coats for application to one or more film layers constituting a facestock, are provided in the description of various examples herein.

A wide range of thicknesses and coat weights can be used for this layer or collection of layers. A representative preferred range of coating weights for a hide coat is from about 1 to about 12 grams per square meter ($g/m^2$ or gsm), more preferably from about 4 to about 10 $g/m^2$, and most preferably from about 6 to about 8 $g/m^2$. It will be appreciated that the invention includes the use of hide coats having coating weights less than or greater than these amounts.

Pressure Sensitive Adhesives

As noted, it is generally preferred that pressure sensitive adhesives be used in the high opacity multilayer laminates and label assemblies. However, other adhesives can be used. Adhesives applicable to this construction include, but are not limited to, permanent adhesives, removable adhesives, ultra-removable adhesives, heat-activated adhesives, moisture-activated adhesives, and radiation-activated adhesives. The adhesives may also be classified according to the chemical composition type. These types include, but are not limited to, natural rubber, acrylic emulsion, hot melt, warm melt, solvent-based, silicone, and acrylic radiation-curable adhesives.

Adhesive coating weight depends on the particular needs of the application. Adhesive coat weights of approximately 20 grams per square meter ($g/m^2$ or gsm) are preferred. Coat weights significantly greater than approximately 25 $g/m^2$ are less desirable because the adhesive can ooze from under the label causing errors in printers. Adhesive ooze after application of the label to a substrate can cause adhesion to additional surfaces. For example, a label with a high coat weight adhesive attached to an envelope can adhere to other envelopes during a mail-handling process. Coat weights significantly less than approximately 15 $g/m^2$ can have poor adhesion to substrates causing the label to lift or pull off of the substrate to which it is attached.

A typical range of adhesive layer thickness is from about 0.1 mil (2.54 μm) to about 10 mil (254 μm), again depending on the needs of the application. A preferred thickness of the adhesive layer is from about 0.5 mil (12.7 μm) to about 3 mil (76.2 μm). It will be appreciated that the relationship between the adhesive coating weight and the adhesive layer thickness may vary greatly when comparing different adhesives. The adhesive coat weights and the adhesive layer thicknesses noted herein are merely guidelines.

Liner

The choice of liner materials used also depends on the particular needs of the application. Typical types of liner materials include, but are not limited to, paper (super calendered, lacquer or varnish-coated, glassine, kraft), film (polyolefin, polyester), foil, glass, and multilayer construction (polyolefin-coated paper). For cost reasons and ease of printing in desktop printers, paper is the liner material of choice.

Typical thicknesses of the liner material range from about 0.5 mil (12.7 μm) to about 5 mil (127 μm).

As will be appreciated, liners typically include one or more release coatings. Surface energy and rheological properties are the critical characteristics of the release coating on the liner. These properties of the release coating should be designed such that the liner or release coating may be poorly wetted by the adhesive that is to be used. The release values should be low enough such that the labels can be easily removed from the liner without curling or deforming the label, yet high enough to prevent the labels from prematurely separating from the liner, for example, while within a desktop printer.

Laminates, Labels, and Label Sheets

FIG. 1 is a schematic cross sectional view of a preferred embodiment multilayer laminate 10 in accordance with the invention. The preferred embodiment laminate 10 comprises a facestock 32 that includes a top coat layer 20 and a film layer 30. The laminate 10 also comprises a liner 50 and layer of adhesive 40 which preferably includes a pressure sensitive adhesive disposed between the facestock 32 and the liner 50. The top coat layer 20 preferably defines an outermost exposed face 22 for receiving printing or other application of indicia or the like.

Figure 2:
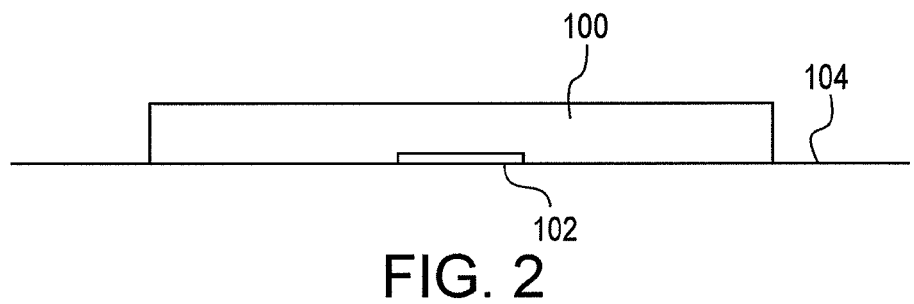
FIG. 2 is a schematic cross sectional view of a representative label according to a preferred embodiment applied to a substrate.
Figure 2A:
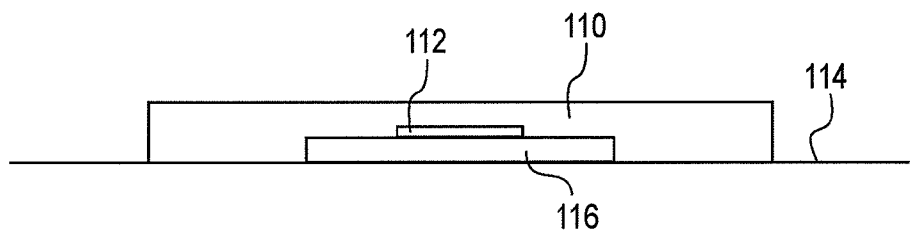
FIG. 2A is a schematic cross sectional view of another representative label according to another preferred embodiment applied to a substrate.

Referring to FIG. 2, the present invention also relates to labels 100, associated label sheets and related methods. The labels 100 are used to cover existing indicia 102 on substrates 104, for example packages and envelopes, so that the substrate 104 can be reused. In use, the labels 100 prevent viewing of the underlying indicia 102. Referring to FIG. 2A, the present invention also relates to labels 110, associated label sheets and related methods. The labels 110 are used to cover existing labels 116 having indicia 112, the labels 116 disposed on substrates 114, for example, packages and envelopes, so that the substrate 114 can be reused. In use, the labels 110 prevent viewing of the underlying indicia 112. The label embodiments of the present invention are characterized by their properties, namely opacity, brightness, whiteness index and color.

Figure 3:
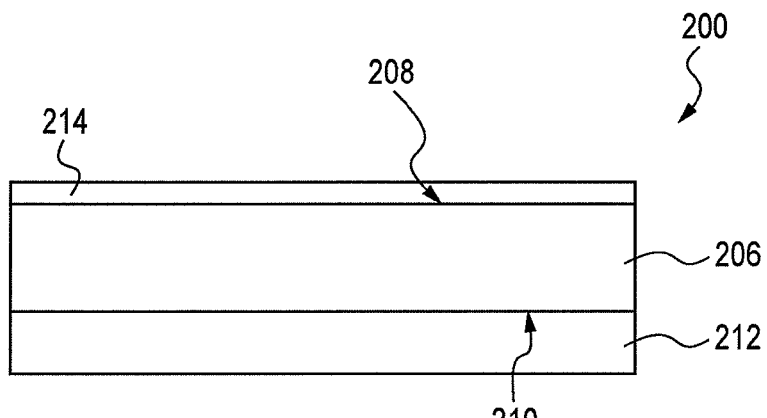
FIG. 3 is a schematic cross sectional view of a preferred embodiment label according to the invention.

A sectional view of another preferred embodiment label 200 is shown in FIG. 3 and includes a facestock 206 having a first surface 208 and a second surface 210, and a layer of pressure sensitive adhesive ("PSA") 212 proximal to the second surface of the facestock. Proximal, as used herein, means nearby and does not preclude intervening structures, for example, additional layers or gaps. The label can optionally include an indicia-accepting layer 214 proximal to the first surface 208 of the facestock 206.

The label 200 is tailored to exhibit an opacity of greater than or equal to approximately 99.0%, a brightness value of greater than or equal to approximately 94.5%, a CIELAB L* greater than or equal to approximately 93.5, and a CIELAB b* less than or equal to approximately −5.0. Most preferably, the opacity is greater than 99.7%. Alternatively, the label is constructed to have a whiteness index greater than or equal to approximately 110. By "alternatively," it is meant that instead of the label exhibiting the previously noted CIELAB parameters, the label exhibits a particular whiteness index as measured pursuant to the ASTM E313 specification as noted herein. These properties are achieved by use of a combination of titanium dioxide and one or more optical brighteners in the noted proportions in the facestock 206 and/or the layer 214. These properties may be enhanced or further promoted by modifying the facestock 206, the pressure sensitive adhesive 212, or both. Modifications can include the use of additives in the facestock or pressure sensitive adhesive and the use of additional thin layers of materials, as described herein. Furthermore, additional steps can be taken to increase opacity of the label during manufacture including, for example, increasing the film density, increasing the film thickness, increasing the basis weight and/or increasing binder or sizing levels.

Figure 4:
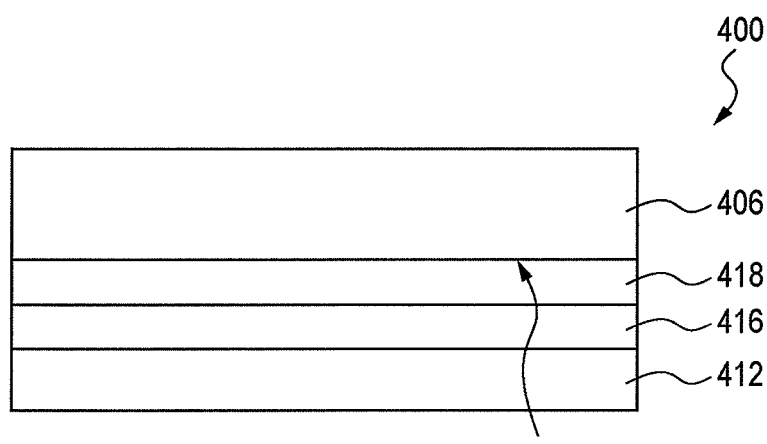
FIG. 4 is a schematic cross sectional view of another preferred embodiment label according to the invention.

A label 400 according to another preferred embodiment is shown in FIG. 4. In this label embodiment, a facestock 406 is coated on its second surface 410 with a second layer 418 including a primer and at least one second layer additive. The second surface 410 is also coated with a first layer 416 including a primer and at least one first layer additive. The first and second layers are coupled between the facestock 406 and a layer of an adhesive 412. One of the layers, e.g. the first layer 416 or the second layer 418, is light absorbing and the other layer is light reflecting. In one embodiment, the first layer 416 is configured to absorb light and the second layer 418 is configured to reflect light.

The primer of the first and second layers 416 and 418, respectively, can be the same, or they can be different primers. Materials suitable for use as primers are compatible with the additives included in the respective layer. The additives should remain evenly dispersed in the primer. The primers are preferably aqueous dispersions of synthetic latex. Dispersions including polyvinyl acetate, styrene butadiene rubber, polyvinyl alcohol, starch and styrene acrylics are non-limiting examples of suitable primers.

A wide range of thicknesses and coat weights can be used for the primer layer or collection of layers. A representative preferred range of coating weights for a primer layer is from about 0.5 to about 12 grams per square meter (g/m² or gsm), more preferably from about 2 to about 10 g/m², and most preferably from about 4 to about 8 g/m². It will be appreciated that the invention includes the use of primer layers having coating weights less than or greater than these amounts.

The additives in the first layer 416 are chosen to absorb light, thereby increasing the opacity of the layer compared to a similar layer without the additive. As used herein, the phrase "increasing the opacity" means the opacity of a material is greater than the opacity of another material. Suitable first layer additives include, but are not limited to, carbon black, metallic flakes, other metallic particles and other dark dispersants, as well as dark dyes, in particular dark blue dyes and dark gray dyes. Although metal agents are noted, it is particularly preferred that this layer be free from any metallic pigments, metallic agents, or metallic additives.

The additives in the second layer 418 are chosen to reflect light, and particularly in a diffuse manner, i.e., randomly and evenly scattered, although materials that absorb and re-emit light are also suitable. Additives suitable for inclusion in the second layer include, but are not limited to, titanium dioxide, calcium carbonate, in particular precipitated calcium carbonate, barium sulfate, aluminum trihydrate, talc, zinc sulfide, diatomaceous silica, clay, chalk, ash, finely dispersed gases, stilbenes, azoles, coumarins, pyrazenes and napthalimides. It is particularly preferred that this layer be free from any metallic pigments, metallic agents, or metallic additives.

In one aspect of this label embodiment 400, the first layer 416 is directly adjacent to the second surface 410 of the paper facestock 406. As used herein, directly adjacent means that the layer is in direct contact with the second surface of the facestock with no intervening layers. It is believed that in this instance, the first layer absorbs light passing through the facestock, thus increasing the opacity of the label. In another instance of this label embodiment the second layer 418 is adjacent to the second surface of the facestock. It is believed that in this instance, the second layer reflects light passing through the facestock, thus increasing the opacity of the label.

Figure 5:
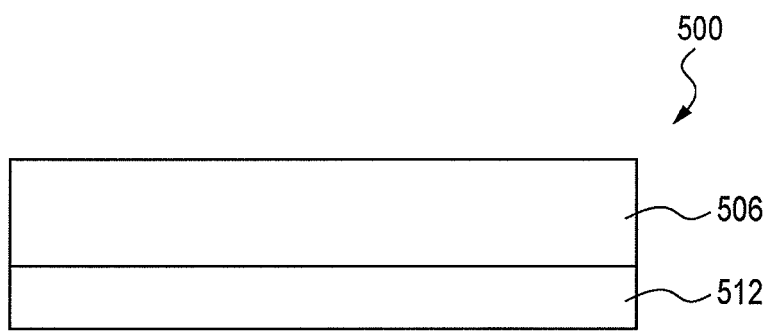
FIG. 5 is a schematic cross sectional view of yet another preferred embodiment label according to the invention.

In another label embodiment 500, as shown in FIG. 5, a facestock 506 includes at least one facestock additive and a layer of pressure sensitive adhesive 512 includes at least one adhesive additive. As a result of the inclusion of the at least one facestock additive and the at least one adhesive additive, the label has an opacity greater than if the at least one facestock additive and at least one adhesive additive were not included.

Pigments, fillers and optical brighteners can affect the brittleness, tensile strength and cuttability, among other attributes, of a film layer. Film layers can become more brittle, have less tensile strength, be more difficult to cut and cause cutting blades to dull sooner than expected. Pigments, fillers and optical brighteners can affect the peel strength, tack, shear and viscosity, among other attributes, of adhesives. The adhesive can lose peel strength, tack and shear, and thus become less aggressive. The viscosity of the adhesive can increase making it difficult to apply to substrates. Because the physical properties of the film layer and adhesives can be negatively affected by additives, it can be difficult obtain sufficient opacity to block out underlying indicia when the film and adhesive are made into a label.

Referring further to FIG. 5, the amount or concentration of additives in the pressure sensitive adhesive 512 is chosen to minimally impact the adhesive's properties while providing opacity. If the level of additives is too high, the PSA will have insufficient adhesive properties to allow the label 500 to adhere to envelopes and packages during handling prior to delivery. If the level of additives is too low, underlying indicia may be visible through the applied label. Thus, the concentration of the additives in the pressure sensitive adhesive is such that the PSA exhibits sufficient adhesive properties whereby the label adequately adheres to envelopes and packages; and the label exhibits sufficient opacity when used in combination with the inventive face stock whereby underlying indicia or previous markings on envelopes and packages is not visible through the label.

The amount or concentration of additives in the facestock sheet 506 is chosen to provide maximum opacity of the label 500 when attached to an envelope or package while maintaining desirable properties including printability in laser and inkjet printers and copiers, stiffness, machinability in processes used to manufacture labels, whiteness and brightness.

A preferred method 600 of achieving the goal of opaque labels 200 is to include additives in the adhesive 212, as shown in step 608 of FIG. 6, to obtain as high an opacity as possible while maintaining adhesion to a substrate. The first three steps 602, 604 and 606, of the method provide additives, adhesive and film layer material, respectively. Additive levels can be adjusted during the manufacture of the facestock in step 610 to achieve at least 99.0% opacity in the final product produced in step 612.

In an alternative preferred method 700, shown in FIG. 7, the first three steps 702, 704 and 706, involve providing additives, adhesive and film material, respectively. The facestock can be made as opaque as possible, step 708, while maintaining film properties sufficient for converting. Then a sufficient amount of additives are included in the adhesive, step 710, to achieve 99.0% opacity in the label stock (see later discussion) produced in step 712. Most preferably, the opacity is greater than 99.7%.

The at least one facestock additive can be chosen from, but not limited to, titanium dioxide, calcium carbonate, in particular precipitated calcium carbonate, barium sulfate, aluminum trihydrate, talc, zinc sulfide, diatomaceous silica, clay, chalk, ash, finely dispersed gases, stilbenes, azoles, coumarins, pyrazenes and napthalimides. Other acceptable facestock additive materials are those that increase the opacity of the facestock by reflecting light rather than transmitting or absorbing light. It is particularly preferred that this layer be free from any metallic pigments, metallic agents, or metallic additives.

The at least one adhesive additive can include carbon black, titanium dioxide, metallic flakes, other metallic particles and other dark dispersants, as well as dark dyes, in particular dark blue dyes and dark gray dyes. Other materials that absorb light, rather than reflect or transmit light, can also be used. Although metallic agents are noted, it is generally preferred that the adhesive layer be free of any metallic additives or agents.

Figure 8:
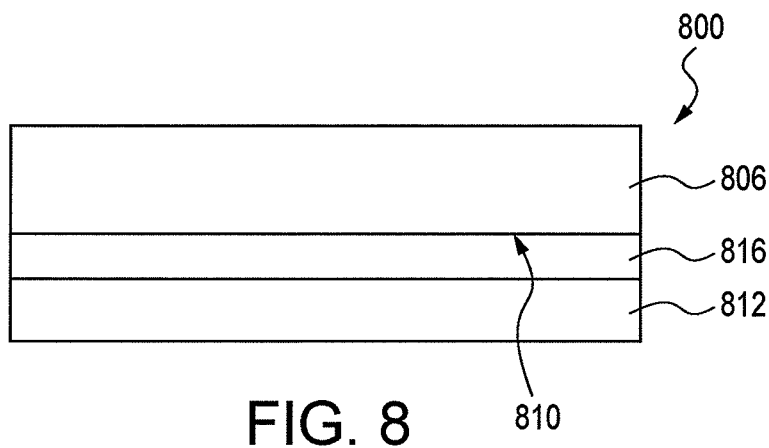
FIG. 8 is a schematic cross sectional view of yet another preferred label according to the invention.

In yet another label embodiment 800, shown in FIG. 8, a single pigmented layer 816 is coupled between a facestock 806 and a pressure sensitive adhesive 812. The pigmented layer preferably includes light absorbing materials. The light absorbing materials include carbon black, metallic flakes, other metallic particles and other dark dispersants, as well as dark dyes, in particular dark blue dyes and dark gray dyes. In one preferred instance, the pigmented layer is blue. Although metal agents are noted, it is particularly preferred that this layer be free from any metallic pigments, metallic agents, or metallic additives.

In yet another embodiment, the facestock 806 includes at least one whiteness enhancer. The at least one whiteness enhancer can include titanium dioxide, calcium carbonate, in particular precipitated calcium carbonate, barium sulfate, aluminum trihydrate, talc, zinc sulfide, diatomaceous silica, clay, chalk, ash, finely dispersed gases, stilbenes, azoles, coumarins, pyrazenes and napthalimides.

The facestock 806 is preferably made with a grammage higher than current facestocks suitable for use in pressure sensitive labels. Grammage of facestocks suitable for use in pressure sensitive labels is approximately 70 g/m$^2$, and has a low enough opacity to allow underlying indicia 102 to be discerned. To increase the opacity, the pigmented layer 816 (also referred to as a back coat or size coat) is applied to the second surface 810 of the facestock. Preferably, the pigmented back coat is blue to have minimal impact on the whiteness of the label 800, but other colors may also prove useful. Useful blue pigment dyes include IRGALITE BLUE RL and IRGALITE BLUE RM (both available from Ciba Specialty Chemicals of High Point, N.C.) and others. The grammage of the facestock and the pigmented back coat provide opacity to the finished label such that any underlying indicia are effectively blocked out. A preferred facestock grammage is approximately 90 g/m$^2$, while the pigmented back coat is preferably approximately 10 g/m$^2$.

The facestock 806 is coated with a layer 812 of pressure sensitive adhesive suitable for the label's intended use. Typically, permanent PSAs are used, for example those described in U.S. Pat. No. 6,423,392, but other types of PSAs, for example removable or repositionable adhesives, for example those noted in U.S. Pat. No. 4,925,908, can be used. The adhesive is preferably coated at between approximately 15 g/m² to approximately 25 g/m², more preferably approximately 18 g/m² to approximately 20 g/m².

Any of the label embodiments 100, 200, 400, 500 and 800 can further include an indicia-accepting layer, such as the layer 214 proximal to the first surface 208 of the facestock 206 as shown in FIG. 3. The indicia-accepting layer can be any of those known in the art to allow acceptance of ink-jet ink, laser toner, or hand-held writing instrument markings. In addition, the indicia-accepting layer can increase the opacity of the label, preferably by reflecting light.

All of the label embodiments 100, 200, 400, 500 and 800 include at least two layers wherein one layer is a facestock 206, 406, 506, and 806 and the other layer is an adhesive 212, 412, 512 and 812. Additional layers 416, 418 and 816 can also be present, as previously discussed. Any of the laminates, labels, or label sheets described herein can include one or more hide layers. As previously described, the one or more hide layers are disposed along a face of a film layer that is oppositely directed from the top coat. Thus, referring to FIG. 1 for example, in the event that laminate 10 included a hide coat, such hide coat would be present between layers 30 and 40. The labels herein described are meant to remain intact during use, that is, the labels are not intended to delaminate. The entire label should be removable from the substrate when removable or ultraremovable adhesives are used, or either the label or the substrate should tear, particularly when the substrate is paper. In neither situation should the layers of the label separate from one another.

Figure 9:
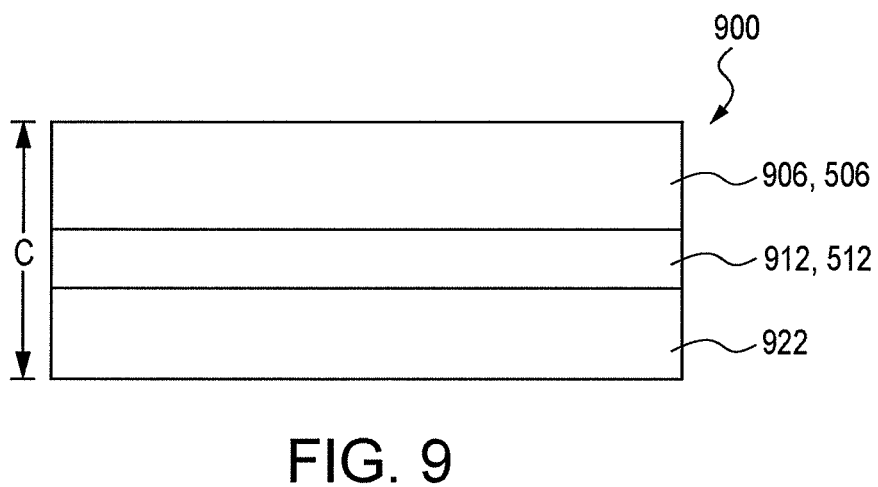
FIG. 9 is a sectional view of another preferred embodiment label sheet carrying the label of FIG. 5.
Figure 10:
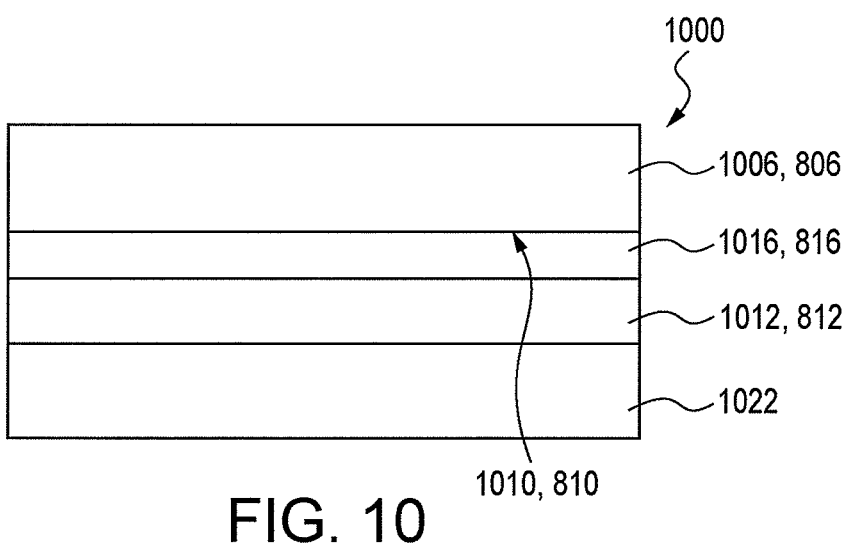
FIG. 10 is a schematic cross sectional view of another preferred embodiment label sheet carrying the label of FIG. 8.

A label sheet embodiment 900 using the label stock 520 of FIG. 5 is shown in FIG. 9 and a label sheet embodiment 1000 using the label stock 820 of FIG. 8 is shown in FIG. 10. Label sheet embodiments 900 and 1000 can be made by adding a release-coated liner 922 and 1022, respectively, to any of the label embodiments. The release-coated liner is used to protect the pressure sensitive adhesive 912 and 1012 and to allow the adhesive-backed label to be passed through a printer, in particular, a desktop printer that can be attached to a personal computer. The release-coated liner can be those routinely used for label manufacture including paper, film and film-coated paper liners. Any release system is suitable in which the release value is greater than or equal to approximately 50 gsm. Release systems can include silicones, waxes, fluorocarbons and other abherent materials. The release coating is usually less than or equal to approximately 2 g/m².

Figure 11:
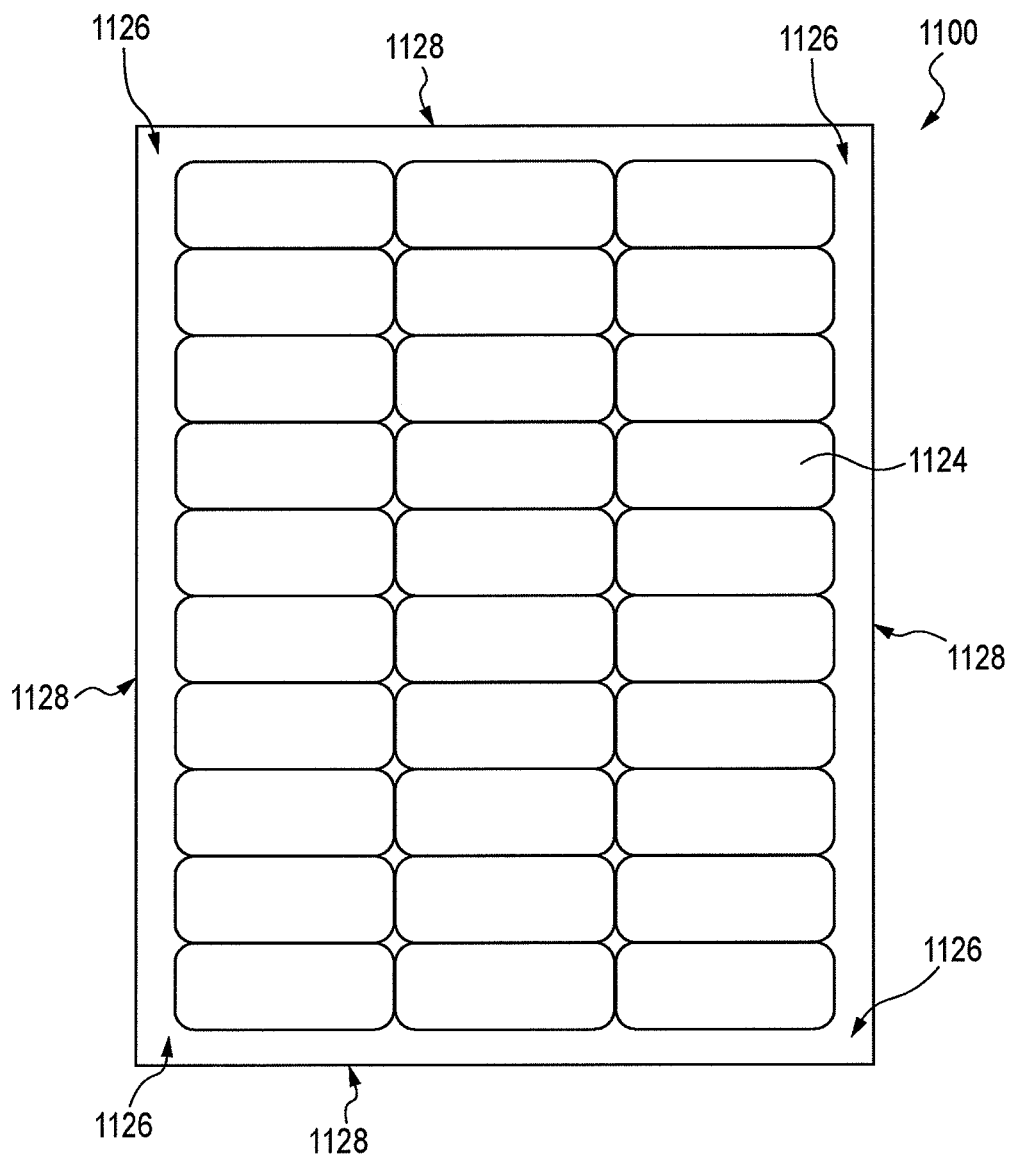
FIG. 11 is a top plan view of another preferred embodiment label sheet according to the present invention.

Referring additionally to FIG. 11, label sheets 1100 having labels 1124 are generally meant to be printed upon by hand-held writing instruments or printers. Label sheets intended to be printed upon using a printer are constructed to allow passage through the printer without becoming caught on any of the printer's mechanical parts. Some of the many concerns regarding the construction of the label sheet include the thickness and curl, or flatness, of the label sheet to be printed.

Printers generally exhibit tight tolerances and tight turns in the path a label sheet 1100 follows while being printed. Label sheets that are too thick or high in caliper can have difficulties during transport through a printer. Thick label sheets can be improperly picked up by the paper transport mechanism resulting in a jam as the sheet enters the printer. Even if a thick sheet is transported successfully into a printer, tolerances between rollers may prevent the sheet from completing the paper path without becoming stuck or bound inside the printer. Also, if the sheet is too thick, it may be too stiff to bend around the printer's internal rollers and become jammed inside the printer. Preferred embodiments of the label sheet have an overall caliper ("C") (see also FIG. 9) of less than or equal to approximately +0.01 inch, or about 10 mils.

The lower limit for caliper is usually not an issue for label sheets 1100. Because the label sheet includes a facestock 906, a layer of adhesive 912 and a release-coated liner 922, the sheet is usually thick enough to avoid printing difficulties associated with thin sheets. The difficulties that can be encountered with thin sheets include the sheet not being picked up by the sheet transport mechanism of the printer and jamming inside the printer because the sheet is not stiff enough. Sheets with insufficient stiffness do not follow the printer's paper path because free edges can bend out of the paper path and become caught on internal printer parts. Additionally, label sheets that are too thin can have labels insufficiently opaque to hide covered indicia on a substrate to which the label has been applied. Preferred embodiments of the label sheet have an overall caliper of greater than or equal to approximately +0.003 inch, or about 3 mils.

Curl is a measure of how well a label sheet 1100 conforms to planarity. Curl can be especially pronounced at the corners 1126 of the label sheet and if the magnitude of the curl is too high, the corners of the sheet can become lodged inside a printer during printing. As shown in FIG. 11, sides 1128 of the sheet 1100 generally meet at corners 1126. Curl can be determined by placing a label sheet on a flat surface in a controlled environment with the facestock 906 away from the flat surface. Each corner can be inspected and the deflection of any corner lifted from the flat surface is measured and recorded as a positive curl value. The label sheet is then placed onto the flat surface with the facestock against the flat surface. Again, the deflection of any corner lifted from the flat surface is measured, this time being recorded as a negative curl measure. A label sheet having maximum curl values less than or equal to approximately 0.5 inch in magnitude are acceptable. For example, a sheet with −0.6 inches of curl is unacceptable. And, a sheet with +0.6 inches of curl is also unacceptable. A label sheet having maximum curl values less than or equal to approximately 0.25 inch in magnitude is preferred. One example embodiment has measured curl values between approximately +0.25 inch and approximately −0.5 inch.

One embodiment of a label sheet 1100 includes a label stock 920 (see FIG. 9) and a release-coated liner 922. The label stock includes a facestock 906 and a layer of pressure sensitive adhesive 912. The release-coated liner is coupled to the layer of pressure sensitive adhesive. The label stock has an opacity greater than or equal to approximately 99.0%. The label stock has a whiteness index greater than or equal to approximately 110, or alternatively, a brightness greater than or equal to approximately 94.5%, a CIELAB L* greater than or equal to approximately 93.5 and a CIELAB b* less than or equal to approximately −5.0. Most preferably, the opacity is greater than 99.7%. The total caliper of the label sheet is less than or equal to approximately +0.01 inch, or 10 mils.

An opaque label sheet 1100 of the present invention is machine printable in laser and inkjet printers and copiers and has the following performance characteristics:
1) Total label sheet thickness: +0.010 inch maximum
2) Curl: 0.5 inch maximum at any corner 1126 of the sheet
3) Release: The force required to remove a label 1124 from the release-coated liner 922 is at least 30 g/in² (4.65 g/cm²).
4) Smooth Edges: Edges 1128 are free of nicks and tears. No adhesive ooze at sheet edges Referring to FIG. 12, one embodiment of a method 1200 for manufacturing a label stock includes the steps of providing a facestock 1202, providing a pressure sensitive adhesive 1204 and coupling the pressure sensitive adhesive to the facestock 1206. The label stock thus formed has an opacity greater than or equal to approximately 99.0%. The label stock also includes a whiteness index greater than or equal to approximately 110, or alternatively, a brightness greater than or equal to approximately 94.5%, a CIELAB L* greater than or equal to approximately 93.5, and a CIELAB b* less than or equal to approximately −5.0. Most preferably, the opacity is greater than 99.7%.

Referring to FIG. 13, another embodiment of a method 1300 for manufacturing a label stock includes providing a pressure sensitive adhesive in the form of a layer 1304 and providing a facestock 1302. The step of coupling the layer of pressure sensitive adhesive to the facestock includes laminating the pressure sensitive adhesive layer and facestock together 1306 to produce the label stock.

Figure 14:
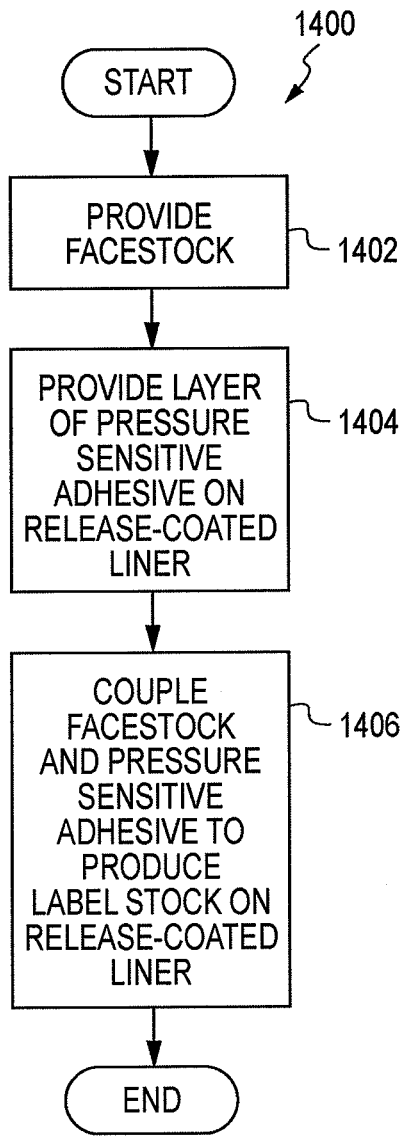
FIG. 14 is a flowchart of yet another preferred method for producing a label stock according to the invention.

Referring to FIG. 14, yet another embodiment of a method 1400 for manufacturing a label stock includes the pressure sensitive adhesive being provided on a release-coated liner at step 1404. The pressure sensitive adhesive can be applied to the release-coated liner by any known means, including die coating, curtain coating, extrusion and spray coating. A facestock is provided in step 1402. Laminating the pressure sensitive adhesive layer and the facestock together 1406 produces the label stock attached to the release coated liner.

Those skilled in the art of manufacturing pressure sensitive adhesive labels 100, 200, 400, 500, 800, particularly those designed for use with desktop printers, are able to produce flat label sheets 1100. Methods known to those skilled in the art include balancing the tension of the facestock such as facestock 906 and the release-coated liner, such as liner 922, during fabrication and balancing the moisture levels of the components of the label sheet. The moisture level in the label sheet can be adjusted by heating any or all of the layers in the assembly such as previously noted layers 206, 212, 406, 412, 416, 418, 1006, 1012, 1016, 1022 to lower the moisture level or by subjecting any or all of the layers to steam to increase the moisture level. Both the facestock and the release coated liner can be subjected to these treatments to balance the moisture level.

Another embodiment of a method for manufacturing a label stock includes the facestock and pressure sensitive adhesive being permanently attached. The facestock and pressure sensitive adhesive should not delaminate from one another during use.

OTHER ASPECTS OF THE INVENTION

The anti-static characteristics of the preferred embodiment laminates or facestock are another feature of the present invention. The reduced static benefit is provided by the use of nonmetallic pigments. As previously noted, nonmetallic pigments include titanium dioxide (and potentially other metallic oxides), barium sulfate, silica dioxide, calcium carbonates, kaolin clays, carbon blacks or similar inorganic or organic materials. And, as previously noted, nonmetallic pigments typically exclude metallic pigments such as aluminum particles or aluminum flakes. In U.S. Pat. No. 5,256,490, metallic pigment coatings were used to provide a high opacity benefit. Coating an insulator such as polyester film with a metallic pigment coating inadvertently increases the propensity of the multiple sheets to store electrical charge. The laser printing process involves charging a substrate to allow for transfer of toner to the substrate. Therefore, printing multiple sheets results in enough electrical charge storage to cause a static shock to consumers when removing printed sheets from the laser printer.

EXAMPLES

Test Methods

Appearance tests: A typical opacity measuring method involves measuring the contrast ratio of the facestock when it is placed in front of white and black backgrounds. This and the following appearance tests may be performed using a MACBETH COLOR-EYE 2020 PLUS spectrophotometer (Gretag-Macbeth AG of Regensdorf, Switzerland). A 2 mils white high opacity polyester facestock exhibits 91% opacity. That polyester facestock is Hostaphan W270 and is available from Mitsubishi Polyester Film, Inc. of Greer, S.C. Brightness of a surface is determined by following the Technical Association of the Pulp and Paper Industry ("Tappi") T-452 om-92 test method. This method is based upon reflection of blue light of 475 nm wavelength. Whiteness index, as used herein, is based upon the ASTM E313 specification. Whiteness is the degree to which a surface matches a white reference standard. There are many alternative ways to describe color. Color, as used herein, is the color space defined as CIE L*a*b*(CIELAB), developed by the International Commission on Illumination (Commission Internationale d'Eclairage or CIE). In this 3-dimensional color space system, L* (CIELAB L*) represents the lightness of the color and ranges from 0 (black) to 100 (white), a* represents the color's position along the red (magenta)/green axis (negative values represent green and positive values represent red or magenta), and b* (CiELAB b*) represents the color's position along the blue/yellow axis (negative values represent blue and positive values represent yellow).

Caliper test method: The thickness of a single sheet of film is measured with the use of an EMVECO Model 210-A Microgage micrometer available from Emveco Inc. of Newberg, Oreg.

Example 1

In one investigation, various top coats having different concentrations of titanium dioxide were prepared by combining titanium dioxide intermediate formulation identified in Table 4 with a laser top coat base intermediate formulation identified in Table 5 along with an optical brightener. The resulting top coats are noted below in Table 1. Table 1 provides an indication as to the percentage of titanium dioxide resulting in a top coat formulation prepared by combining a titanium dioxide intermediate (the formulation of which is noted in Table 4) and a laser top coat base intermediate (the formulation of which is noted in Table 5). Thus, referring to Table 1, if a 5% concentration of titanium dioxide is desired in a laser top coat layer, one combines 6.51% of the titanium dioxide intermediate, 93.29% of the laser top coat base intermediate, and 0.2% UVITEX. The optical brightener is UVITEX available from Ciba Specialty Chemicals of High Point, N.C. UVITEX optical brightener is 2,5 thiophenediylbis (5-tert-butyl-1,3-benzoxazole).

TABLE 1

Top Coats With Different Concentrations of TiO₂

| (percent TiO2) Laser top coat | 0% TC | 5% TC | 10% TC | 15% TC | 20% TC |
|---|---|---|---|---|---|
| Titanium Dioxide Intermediate | 0 | 6.51 | 13.02 | 19.53 | 26.04 |
| Laser Top Coat Base Intermediate | 99.8 | 93.29 | 86.78 | 86.78 | 86.78 |
| UVITEX | 0.2 | 0.2 | 0.2 | 0.2 | 0.2 |
| Gravure plate | 100HK | 100HK | 100HK | 100HK | 100HK |
| L* Value D65 | 93.26 | 94.33 | 94.29 | 94.79 | 94.89 |
| Brightness | 99.96 | 96.97 | 97.98 | 97.65 | 96.78 |
| Whiteness | 145.37 | 123.53 | 126.8 | 121.28 | 117.33 |
| B* | −10.94 | −6.18 | −6.93 | −5.65 | −4.94 |
| Hide coat | 2 with 100HK | 2 with 100HK | 2 with 100HK | 2 with 100HK | 2 with 100HK |

The facestock can include one or more additional layers. Examples of these other additional layers are set forth below in Table 2 as follows.

TABLE 2

Facestock Layers

| | Caliper (mils) | Opacity | Whiteness | Brightness |
|---|---|---|---|---|
| D5 - Laser top coat 14 100HK (~4 gsm)/2M WH PET/Hide coat 9 100HK + 150HK (~6 gsm) | 2.33 | 99.95 | 126.95 | 97.13 |
| D9 - Laser top coat 17 100HK (~4 gsm)/2M WH PET/Hide coat 16 100HK/ Hide coat 1 100HK (~8 gsm) | 2.36 | 99.68 | 115.82 | 94.58 |

Two representative preferred embodiment facestocks are noted in Table 2. The first facestock is designated as D5 and includes a hide coat formulation number 9 noted in Table 7 which was applied using a 100 HK and a 150 HK gravure cylinder pattern to a coat weight of approximately 6 g/m² (gsm) onto a face of a 2 mils PET film layer. The PET film layer is available from Mitsubishi Polyester Film, Inc. of Greer, S.C. under the designation Hostaphan W270. Onto the other face of the film layer, a laser top coat having a particular formulation noted in Table 6 as number 14 was applied with a 100 HK gravure cylinder pattern to a coat weight of approximately 4 gsm. The other facestock is designated as D9. Thickness (i.e. caliper) measurements and optical characteristics were taken as described herein and the values presented in Table 2.

Each of the laser top coats and hide coats used in the facestock layers noted in Table 2, were prepared by the following formulations set forth below in Tables 3-7. Specifically, various laser top coats listed in Table 6 were formed by combining various weight proportions of a titanium dioxide intermediate (specified in Table 4) and a laser top coat base intermediate (specified in Table 5) along with an optical brightener. The resulting laser top coats are noted in Table 6. Various hide coats listed in Table 7 were formed by combining various weight proportions of a polyester intermediate (specified in Table 3) and the titanium dioxide intermediate (specified in Table 4), along with several other components. The resulting hide coats are noted in Table 7.

TABLE 3

Polyester Intermediate

| Component | Percent by Weight |
|---|---|
| Toluene | 30.00 |
| Methyl Ethyl Ketone | 42.00 |
| VITEL PE200 | 28.00 |

The polyester intermediate formulation of Table 3 includes VITEL PE 200, an inert polyester binder available from Bostik of Middleton, Mass.

TABLE 4

Titanium Dioxide Intermediate

| Component | Percent by Weight |
|---|---|
| Polyester intermediate | 40 |
| TI-PURE R-900 | 60 |

The titanium dioxide intermediate formulation of Table 4 includes TI-PURE R-900 which is a general purpose titanium dioxide pigment available from E.I. du Pont de Nemours and Company of Wilmington, Del.

TABLE 5

Laser Top Coat Base Intermediate

| Component | Percent by Weight |
|---|---|
| Polyester intermediate | 65.94 |
| TITANTIC KR38S | 00.01 |
| HYDRAL 710 | 06.67 |
| SYLOID 234 | 02.42 |
| Toluene | 16.19 |
| Cyclohexanone | 05.00 |
| Methyl Ethyl Ketone | 03.77 |

The laser top coat base intermediate formulation of Table 5 includes TITANTIC KR38S which is isopropyl-tris (dioctylpyrophosphate) titanate, available from Kenrich Petrochemicals of Bayonne, N.J.; HYDRAL 710 is an extra fine, uniform median particle size of about 1.0 micron in diameter, of specially precipitated white aluminum trihydroxide $Al(OH)_3$, available from Almatis, Inc. of Bauxite, Ark.; and SYLOID 234 which is an amorphous synthetic silica available from W.R. Grace & Company of Columbia, Md.

The various formulations were combined as noted in Table 6, below. UVITEX optical brightener available from Ciba of Basel, Switzerland was used.

TABLE 6

Laser Top Coats

| Laser top coat number | 4 | 5 | 6 | 10 | 11 | 12 | 14 | 15 | 17 | 18 | 19 |
|---|---|---|---|---|---|---|---|---|---|---|---|
| Titanium Dioxide Intermediate | 13.02 | 0 | 26.04 | 13.02 | 13.02 | 6.51 | 6.51 | 6.51 | 13.02 | 0 | 26.04 |
| Laser top coat base Intermediate | 86.78 | 99.8 | 86.78 | 86.78 | 86.78 | 86.78 | 86.78 | 86.78 | 86.78 | 86.78 | 86.78 |
| UVITEX | 0.2 | 0.2 | 0.2 | 0.3 | 0.15 | 0.2 | 0.15 | 0.11 | 0.11 | 0 | 0.11 |

Table 7 summarizes various hide coats that were formed. GIBRALTAR 335-39270 available from Gibraltar Chemical Works of South Holland, Ill. was incorporated as noted.

TABLE 7

Hide Coats

| Hide Coat number | 1 | 2 | 3 | 7 | 8 | 9 | 13 | 16 |
|---|---|---|---|---|---|---|---|---|
| Polyester intermediate | 51.88 | 50.8 | 50.76 | 50.76 | 50.76 | 50.76 | 51.88 | 51.88 |
| Titanium Dioxide Intermediate | 25.84 | 25.4 | 25.38 | 25.38 | 32 | 25.38 | 25.84 | 25.84 |
| GIBRALTAR 335-39270 | 1.81 | 3.55 | 1.18 | 7 | 0 | 0.71 | 2.38 | 0 |
| Toluene | 10.34 | 10.2 | 10.15 | 10.34 | 10.34 | 10.15 | 10.34 | 10.34 |
| Methyl Ethyl Ketone | 10.34 | 10.2 | 10.15 | 10.34 | 10.34 | 10.15 | 10.34 | 10.34 |

The coatings designated in Tables 8A and 8B were printed using the Gravure plate also designated in the tables. The resulting lightness values, whiteness values, brightness values, b* values, and opacity were taken. These were all printed over a 2 mils white polyester film. The polyester film is available from Mitsubishi Polyester Film, Inc. of Greer, S.C. under the designation Hostaphan W270. The results are summarized below in Tables 8A and 8B.

TABLE 8A

Appearance Characteristics

| | D1 | D2 | D3 | D4 | D5 | D6 |
|---|---|---|---|---|---|---|
| Designation | | | | | | |
| Topcoat used | 11 with 100HK | 11 with 100HK | 11 with 100HK | 12 with 100HK | 14 with 100HK | 15 with 100HK |
| 1st hide coat | 9 with 100HK | 3 with 100HK | 13 with 100HK | 9 with 100HK | 9 with 100HK | 9 with 100HK |
| 2nd hide coat | 9 with 150HK | 3 with 200HK | | 9 with 150HK | 9 with 150HK | 9 with 150HK |
| Results | | | | | | |
| L* Value D65 | 93.85 | 94.08 | 93.49 | 94.32 | 93.78 | 94.22 |
| b* | −6.14 | −6.32 | −6.82 | −8.71 | −8.15 | −7.82 |
| Brightness | 97.35 | 96.55 | 95.19 | 101.34 | 98.39 | 99.04 |
| Whiteness | 121.31 | 123.07 | 121.92 | 138.41 | 133.08 | 132.47 |
| Opacity | 99.73 | 100 | 100 | 99.75 | 99.79 | 99.74 |

TABLE 8B

Appearance Characteristics

| Designation | D7 | D8 | D9 | D10 |
|---|---|---|---|---|
| Topcoat used | 17 with 100HK | 19 with 100HK | 17 with 100HK | 19 with 100HK |
| 1st hide coat | 16 with 100HK | 16 with 100HK | 16 with 100HK | 16 with 100HK |
| 2nd hide coat | 3 with 100HK | 3 with 100HK | 1 with 100HK | 1 with 100HK |
| Results | | | | |
| L* Value D65 | 95.25 | 95.2 | 94.52 | 94.41 |
| b* | −6.25 | −4.02 | −6.54 | −4.47 |
| Brightness | 99.53 | 95.96 | 97.88 | 94.4 |
| Whiteness | 126.22 | 112.59 | 125.7 | 112.93 |
| Opacity | 99.51 | 99.68 | 99.75 | 99.73 |

Additional investigations were conducted to determine appearance characteristics of additional representative layered laminates according to the present invention. The results of these investigations are set forth below in Table 9.

TABLE 9

Additional Testing

| | E | D | C | B | A | F | G |
|---|---|---|---|---|---|---|---|
| Designation | | | | | | | |
| Topcoat used | 4 with 100HK | 6 with 100HK | 4/6 50/50 with 100HK | 4 with 100HK | 5 with 100HK | 4 with 100HK | 4 with 100HK |
| 1st hide coat | 2 with 100HK | 3 with 100HK | 3 with 100HK | 1 with 100HK | 2 with 100HK | 2 with 200HK | 2 with 200HK |
| 2nd hide coat | | | | | | 4 with 200HK | 6 with 200HK |

TABLE 9-continued

Additional Testing

| | E | D | C | B | A | F | G |
|---|---|---|---|---|---|---|---|
| Results | | | | | | | |
| L* Value D65 | 93.49 | 94.89 | 94.79 | 94.29 | 93.26 | 93.46 | 93.37 |
| b* | −7.08 | −4.94 | −5.65 | −6.93 | −10.94 | −7.27 | −7.24 |
| Whiteness | 125.8 | 117.33 | 121.28 | 126.8 | 145.37 | 124.4 | 123.98 |
| Opacity | 99.93 | 99.19 | 99.17 | 99.76 | 99.9 | 99.94 | 99.94 |

In another comparative investigation, anti-static agents are materials typically added to a coating or a film to reduce the tendency of static charge built up. Typical anti-static agents are migratory hydrophilic materials such as surfactants and salts which dissipate static charges via moisture retention. An attempt was made to improve the opacity of metallic-containing top coats by increasing the level of the anti-static agent. As noted in Table 10, various amounts of an anti-static agent available under the designation CYASTAT 609, from Cytec Industries of West Paterson, N.J. were used in a laser top coat base intermediate formulation. However, the addition of an anti-stat agent resulted in toner anchorage problems.

TABLE 10

Use of Anti-Static Agents

| | M1 | M2 | M3 |
|---|---|---|---|
| Laser top coat base Intermediate | 100 | 97.13 | 94.27 |
| Cyastat 609 | 0 | 2.86 | 5.72 |
| Gravure plate | 100HK | 100HK | 100HK |

In another series of investigations, the electrical charge retention characteristics of various labels were assessed via measurement of capacitance. Capacitance was measured with a Fluke 26 III multimeter available from Fluke Corporation of Everett, Wash. The capacitance was measured by placing a 4×5 inch label face down (adhesive side up) on an aluminum test panel and contacting one probe to the aluminum panel and one probe through the adhesive contacting the face material.

The results of these measurements are set forth below in Table 11. The label samples M1, M2, and M3 are noted in Table 10. And production coater produced samples D5 and D9 are noted in Table 2. Label samples A, B, C, and D are all commercially available label materials. The capacitance measurements of all samples reveal that the preferred embodiment facestocks D5 and D9 exhibited, along with two of the commercially available labels, the lowest capacitance. As will be appreciated, a low capacitance indicates a low propensity to store electrical charge.

TABLE 11

Capacitance Measurements

| Label | Opacity | L* | b* | Brightness | Whiteness | Capacitance (nF per 20 square inches) | Caliper (mils) |
|---|---|---|---|---|---|---|---|
| M1 | 99.48 | 94.9 | −7.68 | 98.23 | 122.03 | 1.44 | 2.32 |
| M2 | 99.97 | 95.06 | −8.03 | 99.14 | 123.93 | 1.67 | 2.3 |
| M3 | 100 | 95.04 | −7.91 | 98.92 | 123.33 | 1.95 | 2.23 |
| D5 | 99.72 | 94.1 | −7.82 | 97.11 | 121.04 | <0.25 | 2.45 |
| D9 | 99.82 | 94.56 | −5.43 | 94.81 | 111.23 | <0.25 | 2.48 |
| Commercial A | 99.91 | 95.83 | −6.78 | 99.15 | 119.98 | 1.63 | 2.5 |
| Commercial B | 100 | 88.67 | −0.44 | 74.07 | 75.56 | 1.88 | 2.52 |
| Commercial C | 94.5 | 97.16 | −5.27 | 100.41 | 116.2 | <0.25 | 2.28 |
| Commercial D | 94.85 | 96.85 | 1 | 90.81 | 87.62 | <0.25 | 2.28 |

Many other benefits will no doubt become apparent from future application and development of this technology.

All patents, published applications, technical references and standards, and articles noted herein are hereby incorporated by reference in their entirety.

It will be understood that any one or more features or components of one embodiment described herein can be combined with one or more other features or components of another embodiment. Thus, the present invention includes any and all combinations of components or features of the embodiments described herein.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

We claim:
1. A high opacity laser printable film facestock comprising:
a laser printable film facestock having a printable first layer, a second layer, and a third layer, wherein the laser printable film facestock exhibits an opacity greater than or equal to approximately 99.0%, a CIELAB L* greater than or equal to approximately 93.5, a CIELAB b* less than or equal to approximately −5.0, and one or more characteristics selected from the group consisting of (i) a whiteness index greater than or equal to approximately 110, and (ii) a brightness greater than or equal to approximately 94.5%, the laser printable film facestock having a caliper less than or equal to approximately 2.5 mils.

2. The high opacity laser printable film facestock of claim 1, further comprising:
a fourth layer coupled between the second layer and the third layer,
wherein the fourth layer is configured to reflect light and includes a primer and at least one fourth layer additive, and the fourth layer is free from metallic pigments.

3. The high opacity laser printable film facestock of claim 1, wherein the third layer is configured to absorb light and includes a primer and at least one third layer additive.

4. The high opacity laser printable film facestock of claim 1, wherein the third layer is free from metallic pigments.

5. The high opacity laser printable film facestock of claim 1, wherein the first layer is configured to reflect light and includes a primer and at least one first layer additive.

6. The high opacity laser printable film facestock of claim 5, wherein the at least one first layer additive includes titanium dioxide and the at least one first layer additive includes an optical brightener.

7. The high opacity laser printable film facestock of claim 1, wherein the second layer is a film with a softening temperature greater than or equal to approximately 200° C.

8. The high opacity laser printable film facestock of claim 1, wherein the second layer is a polyester film.

9. The high opacity laser printable film facestock of claim 1, wherein the second layer includes a material selected from the group consisting of polyethylene terephthalate, polyimide, polyetherimide, polysulfone, polyethersulfone, polytetraflouroethylene, nylon 6, nylon 6/6, nylon 6,10, nylon 11, nylon 12, polyamide-imide, polybutylene terephthalate, polyetheretherketone, and blends or copolymers thereof.

10. The high opacity laser printable film facestock of claim 9, wherein the second layer includes polyethylene terephthalate.

11. The high opacity laser printable film facestock of claim 1, wherein the first layer includes 2.5 to 12.5% by weight titanium dioxide.

12. The high opacity laser printable film facestock of claim 1, wherein the first layer includes an effective amount of at least one optical brightener.

13. The high opacity laser printable film facestock of claim 12, wherein the concentration of optical brightener in the first layer is from about 0.05% to about 0.75%.

14. The high opacity laser printable film facestock of claim 1, wherein the facestock exhibits an opacity greater than or equal to approximately 99.7%.

15. The high opacity laser printable film facestock of claim 1 wherein the first layer is a top coat layer, the second layer is a film layer, and the third layer is a hide coat, the second layer being disposed between the first layer and the third layer.

16. The high opacity laser printable film facestock of claim 15 wherein the hide coat includes titanium dioxide.

17. A label sheet comprising:
a liner sheet;
a facestock sheet including a laser printable film facestock having a printable first layer, a second layer, and a third layer, wherein the laser printable film facestock exhibits a CIELAB L* greater than or equal to approximately 93.5, and a CIELAB b* less than or equal to approximately −5.0, and an opacity greater than or equal to approximately 99.0%, one or more characteristics selected from the group consisting of (i) a whiteness index greater than or equal to approximately 110, and (ii) a brightness greater than or equal to approximately 94.5%, the laser printable film facestock having a caliper less than or equal to approximately 2.5 mils; and
a layer of pressure sensitive adhesive releasably coupling the liner sheet to the facestock sheet;
wherein the label sheet includes cut lines extending through the facestock sheet but not through the liner sheet to thereby define at least one label.

18. The label sheet of claim 17, wherein the at least one label is two or more labels.

19. The label sheet of claim 17, wherein the pressure sensitive adhesive is selected from the group consisting of permanent adhesives, ultraremovable adhesives, and removable pressure sensitive adhesives.

20. The label sheet of claim 17, wherein the label sheet includes at least one label strip defined by the at least one cut line through the facestock sheet but not the liner sheet, and the label strip includes a plurality of labels.

21. The label sheet of claim 17, wherein the label sheet is configured for printing in a desktop printer or copier.

22. The label sheet of claim 17, further comprising:
a fourth layer coupled between the second layer and the third layer,
wherein the fourth layer is configured to reflect light and includes a primer and at least one fourth layer additive, and the fourth layer is free from metallic pigments.

23. The label sheet of claim 17, wherein the third layer is configured to absorb light and includes a primer and at least one third layer additive.

24. The label sheet of claim 17, wherein the third layer is free from metallic pigments.

25. The label sheet of claim 17, wherein the first layer is configured to reflect light and includes a primer and at least one first layer additive.

26. The label sheet of claim 25, wherein the at least one first layer additive includes titanium dioxide and the at least one first layer additive includes an optical brightener.

27. The label sheet of claim 17, wherein the second layer is a film with a softening temperature greater than or equal to approximately 200° C.

28. The label sheet of claim 17, wherein the second layer is a polyester film.

29. The label sheet of claim 17, wherein the second layer includes a material selected from the group consisting of polyethylene terephthalate, polyimide, polyetherimide, polysulfone, polyethersulfone, polytetraflouroethylene, nylon 6, nylon 6/6, nylon 6,10, nylon 11, nylon 12, polyamide-imide, polybutylene terephthalate, polyetheretherketone, and blends or copolymers thereof.

30. The label sheet of claim 29, wherein the second layer includes polyethylene terephthalate.

31. The label sheet of claim 17, wherein the first layer further includes an effective amount of at least one optical brightener.

32. The label sheet of claim 31, wherein the concentration of optical brightener in the first layer is from about 0.05% to about 0.75%.

33. The label sheet of claim 17, wherein the first layer contains 2.5 to 12.5% by weight titanium dioxide.

34. The label sheet of claim 17, wherein the facestock exhibits an opacity greater than or equal to approximately 99.7%.

35. The label sheet of claim 17, wherein the first layer is a top coat layer, the second layer is a film layer, and the third layer is a hide coat, the second layer being disposed between the first layer and the third layer.

36. The label sheet of claim 35, wherein the hide coat includes titanium dioxide.

* * * * *